US007290256B2

(12) United States Patent
Anderson et al.

(10) Patent No.: US 7,290,256 B2
(45) Date of Patent: Oct. 30, 2007

(54) SEPARATIONS-OF-DUTIES ANALYSIS TOOL FOR OBJECT-ORIENTED INTEGRATED ENTERPRISE WIDE COMPUTING APPLICATIONS

(75) Inventors: Michael E. Anderson, Wappingers Falls, NY (US); Deborah A. Dattilio, Milton, VT (US)

(73) Assignee: International Business Machines Corporation, Armonk, NY (US)

( * ) Notice: Subject to any disclaimer, the term of this patent is extended or adjusted under 35 U.S.C. 154(b) by 1342 days.

(21) Appl. No.: 09/792,919

(22) Filed: Feb. 26, 2001

(65) Prior Publication Data

US 2002/0120482 A1    Aug. 29, 2002

(51) Int. Cl.
*G06F 9/44* (2006.01)
(52) U.S. Cl. .................... 717/165; 717/141; 707/9; 707/103 R; 707/8
(58) Field of Classification Search ........ 709/201–203; 707/100–102; 705/2–60; 726/1; 713/168; 717/164–169, 101, 106, 122, 141
See application file for complete search history.

(56) References Cited

U.S. PATENT DOCUMENTS 5,862,325 A * 1/1999 Reed et al. ................ 709/201
6,158,010 A * 12/2000 Moriconi et al. ............ 726/1
6,363,393 B1 * 3/2002 Ribitzky ..................... 707/102
6,868,406 B1 * 3/2005 Ogg et al. .................... 705/60
2001/0037361 A1 * 11/2001 Croy .......................... 709/203
2002/0087383 A1 * 7/2002 Cogger et al. ................ 705/10
2002/0129246 A1 * 9/2002 Blumenau et al. .......... 713/168
2003/0105648 A1 * 6/2003 Schurenberg et al. ......... 705/2
2005/0144182 A1 * 6/2005 Boris et al. ................. 707/100
2006/0184915 A1 * 8/2006 DeGroote et al. .......... 717/106
2006/0195816 A1 * 8/2006 Grandcolas et al. ........ 717/101
2006/0206866 A1 * 9/2006 Eldrige et al. .............. 717/122

* cited by examiner

*Primary Examiner*—Meng-Al T. An
*Assistant Examiner*—Mark P. Francis
(74) *Attorney, Agent, or Firm*—Gibb & Rahman, LLC; Richard M. Kotulak, Esq.

(57) ABSTRACT

A method and structure for an independent programming tool for analyzing business separations-of-duties conflicts for users and profiles in an object-oriented application, the tool including a database containing a matrix of transactions, descriptions, object authorization values, and transactional separations-of-duties conflicts; an analysis engine adapted to use data from the object-oriented application in conjunction with the matrix to analyze business conflicts and produce separations-of-duties conflict reports about the object-oriented application; and a user interface adapted to control the tool.

27 Claims, 7 Drawing Sheets

| Bus Unit | Bus Proc | Task | Trans | Transaction Description | ActC | Mvt | Object |
|---|---|---|---|---|---|---|---|
| ▷ Basis | | | | | | | |
| | ▷ Authorization Maintenance | | | | | | |
| | | ▷ Change Authorization | SU03 | Maintain Authorizations | 02 | | |
| | | ▷ Create Authorization | SU03 | Maintain Authorizations | 01 | | |
| | ▷ Profile Maintenance | | | | | | |
| | | ▷ Change Profiles | SU02 | Maintain Authorizations Profiles | 02 | | |
| | | ▷ Create Profiles | SU02 | Maintain Authorizations Profiles | 01 | | |
| | ▷ Profile Maintenance | | | | | | |
| | | ▷ Change User | SU01 | User Maintenance | 02 | | S_USER |
| | | ▷ Create User | SU01 | User Maintenance | 01 | | S_USER |
| | | ▷ Maintain Address | SU51 | | | | |
| | | ▷ Maintenance | | | | | |
| ▷ Finance | | | | | | | |
| | ▷ Account Payable | | | | | | |
| | | ▷ Cancel Invoice | MR08 | Cancel Invoice Document | 05,06, | | |

SEPARATIONS-OF-DUTIES ANALYSIS TOOL FOR OBJECT-ORIENTED INTEGRATED ENTERPRISE WIDE COMPUTING APPLICATIONS

BACKGROUND OF THE INVENTION

1. Field of the Invention

The present invention generally relates to object-oriented integrated enterprise wide computing applications, and more particularly to an improved analysis application that utilizes a separations-of-duties matrix to determine conflicting business tasks assigned to users of the application. This tool is intended for use by application auditors and businesses who wish to manage separations of duties within their applications.

2. Description of the Related Art

There are many integrated enterprise wide computing applications that are commercially available. One such scheduling application is SAP R/3 available from SAP AG, Waldorf, Germany. Such applications are commonly an integration of business software that include: financial accounting, order management, supply chain management, etc. Such applications are tailored or configured to meet the business needs of each company and manage a business's resources to increase the business's operating efficiency.

Objected orientated applications utilize transactions (sets of instructions) that operate against a set of data (objects) to perform a desired outcome. To gain access to the data in the system, a person must have a user ID and profile: meaning access to the application and a set of transactions and objects which allows usage. The profile contains the transactions and objects which permit access to specified data in the system.

However, conventional applications do not determine whether a profile can access data that may create a business conflict, such as the ability to procure items and the ability to ship items. Also, conventional applications do not allow customers to analyze separations-of-duties issues within a profile or when multiple profiles are assigned to one user ID. As a result, profiles are created and used with no automated check for conflicting activities. Therefore, it is common for conventional object-oriented applications to incur separations-of-duties conflicts at a transactional level.

As object oriented applications are customized to each company's business requirements, and each business has its own business rules and guidelines, such systems like SAP cannot supply a standard set of transactions and objects which create business conflicts.

SUMMARY OF THE INVENTION

The invention described below addresses the foregoing issues by providing a tool that is useful with any conventional object-oriented integrated enterprise wide computing application. The tool described below contains a base set of business rules for conflicting transactions (the SOD Matrix). The invention checks profiles and user ID's for conflicting transactions, checks which authority is used to perform such transactions, provides an explanation of the conflict, and validates against the SOD matrix that the transactions will not cause a conflict if issued by the same person.

It is, therefore, an object of the present invention to provide an independent programming tool for analyzing business separations-of-duties conflicts for users and profiles in an object-oriented application. The tool includes a database containing a matrix of transactions, descriptions, object authorization values, and transactional separations-of-duties conflicts; an analysis engine adapted to use data from the object-oriented application in conjunction with the matrix to analyze business conflicts and produce separations-of-duties conflict reports about the object-oriented application; and a user interface adapted to control the tool.

The analysis engine is adapted to use a plurality of data tables from the object-oriented application. The first data table include profiles that identify transactions and objects assignable to users; a second data table includes a listing of users and assigned profiles; a third data table indicates which transactions are available for each application; and a fourth data table includes a listing of the objects that are appropriate for the transactions. The analysis engine is adapted to use a separations of duties (SOD) matrix containing restrictions and business conflicts relating to the users, the objects and the transactions. It is also adapted to determine if the users and the profiles have authority to perform function based on the SOD matrix and the second data table. The invention determines, within each of the profiles, whether the transactions are appropriately based on the SOD matrix and the third data table and determines, within each of the profiles, whether the transactions are properly associated with the objects based on the SOD matrix and the fourth data table. The user interface is adapted to produce a listing of authorized profiles by user and a listing of authorized transactions by user, to produce conflict reports. The conflict reports list conflicts stating whether the users and the profiles have the authority to perform conflicting transactions and whether, the transactions are appropriate. The reports include explanations of the conflicts, and instructions to take action on the profiles.

A still further object of the present invention is to provide a structure and method for a tool for identifying conflicts in an object-oriented application. The tool includes a user interface adapted to allow an operator to control the tool; a data input adapted to retrieve data tables from the object-oriented application. The first data table includes profiles identifying transactions and objects assignable to users, a second data table includes a listing of the users and assigned profiles, a third data table indicates which the transactions are available, and a fourth data table includes a listing of the objects appropriate for the transactions. The data input retrieves a separations of duties (SOD) matrix containing restrictions relating to the users, the profiles, the objects, and the transactions. The analysis engine determines what authority the users have based on the SOD matrix and the second data table. Within each of the profiles, the invention determines whether the transactions are appropriate based on the SOD matrix and the third data table and determines, within each of the profiles, whether the transactions are properly associated with the objects based on the SOD matrix and the fourth data table.

The invention can also comprise a method of identifying conflicts in an object-oriented application, the method including retrieving data tables from the application; retrieving a separations of duties (SOD) matrix containing restrictions relating to the users, the objects and the transactions; determining if the users have authority to activate the conflicts based on the SOD matrix and the second data table; determining, within each of the profiles, whether the transactions are appropriate based on the SOD matrix and the third data table; and determining, within each of the profiles, whether the transactions are properly associated with the objects based on the SOD matrix and the fourth data table. The method may further include producing a listing of authorized profiles by user and producing a listing of authorized transactions by user. The SOD matrix is specific to the object-oriented application. The method of the present invention may further include outputting conflict reports, wherein the conflict reports list conflicts if the users have the authority to activate the transactions; the transactions are not appropriate; or the transactions are not properly associated with the objects. The reports include explanations of the conflicts, the objects include specialized databases, and the transactions include instructions to perform operations on the specialized databases.

BRIEF DESCRIPTION OF THE DRAWINGS

The foregoing and other objects, aspects and advantages will be better understood from the following detailed description of preferred embodiments of the invention with reference to the drawings, in which:

FIG. 2B is a schematic drawing illustrating one exemplary data base format of the SOD Matrix;

FIG. 2C is a schematic drawing illustrating one exemplary SOD matrix entry screen for transactions and conflicts;

DETAILED DESCRIPTION OF PREFERRED EMBODIMENTS OF THE INVENTION

Figure 1:
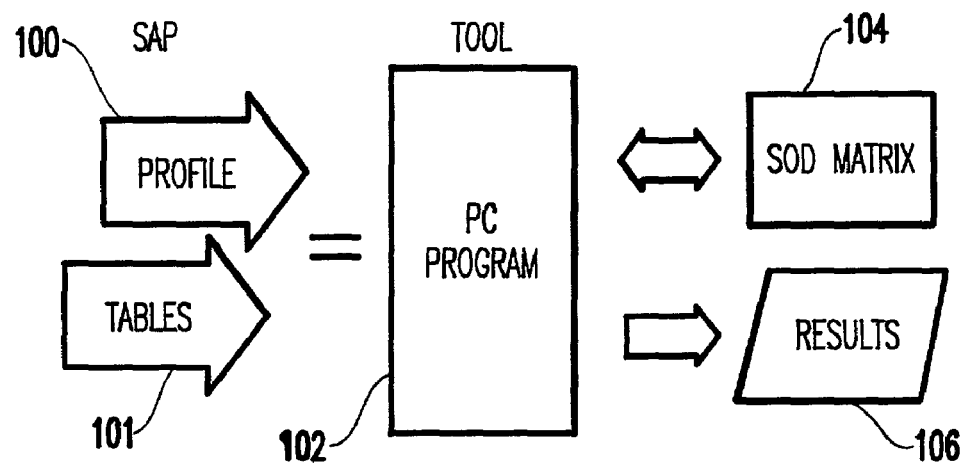
FIG. 1 is a schematic diagram of a tool that combines an object-oriented application and a separations-of-duties matrix.

Referring now to the drawings, and more particularly, to FIG. 1, a schematic diagram conceptually displaying the invention is illustrated. More specifically, the profile 100 and tables 101 of an object-oriented integrated enterprise wide computing application (such as SAP, mentioned above) are retrieved by the inventive tool 102. In addition, the tool 102 utilizes a separations-of-duties matrix 104. As discussed in greater detail below, the inventive tool 102 utilizes the profile and tables 100, 101 in combination with the matrix 104 to determine where conflicts exist between the transactions and associated objects contained in the profile.

Figure 2A:
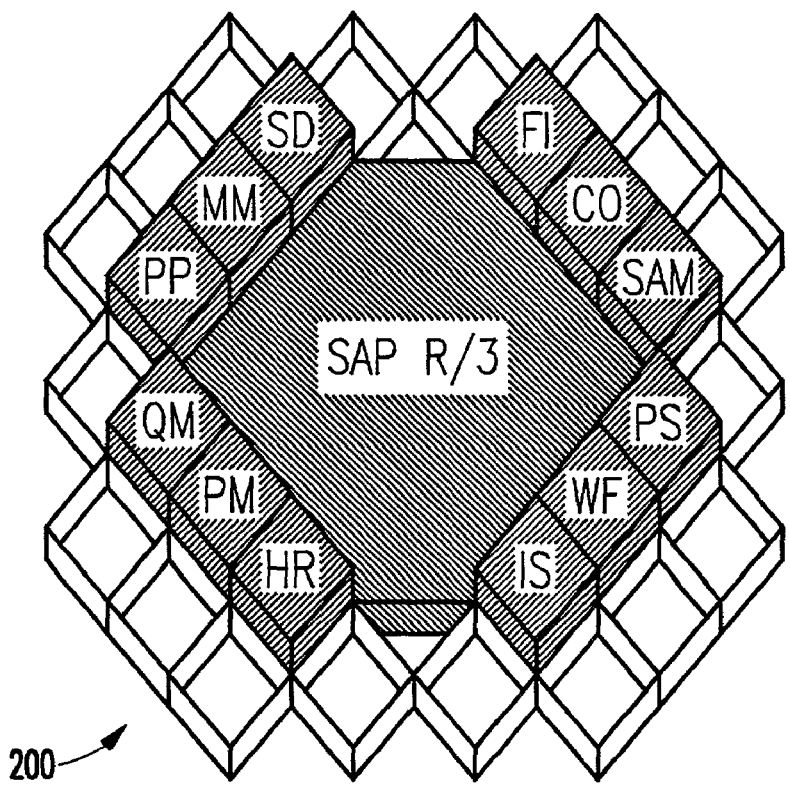
FIG. 2A is a schematic diagram of an object-oriented application (SAP) containing multiple business applications.

FIG. 2A represents the business components 200 that comprise an integrated application such as SAP. In the center of the diagram lies the object-oriented application (in this example SAP R/3). The various business units of the organizations are represented in FIG. 2A by the following abbreviations: (SD) sales and distribution; (MM) material management; (PP) product planning; (QM) quality management; (PM) plant maintenance; (HR) human resources; (FI) Financial Accounting; (CO) controlling; (FA) fixed asset management; (PS) project system; (WF) workflow; and (IS) industry solutions. This diagram illustrates how multiple business components are housed within one application and restricted profiles must be created to control system access.

Figure 2C:
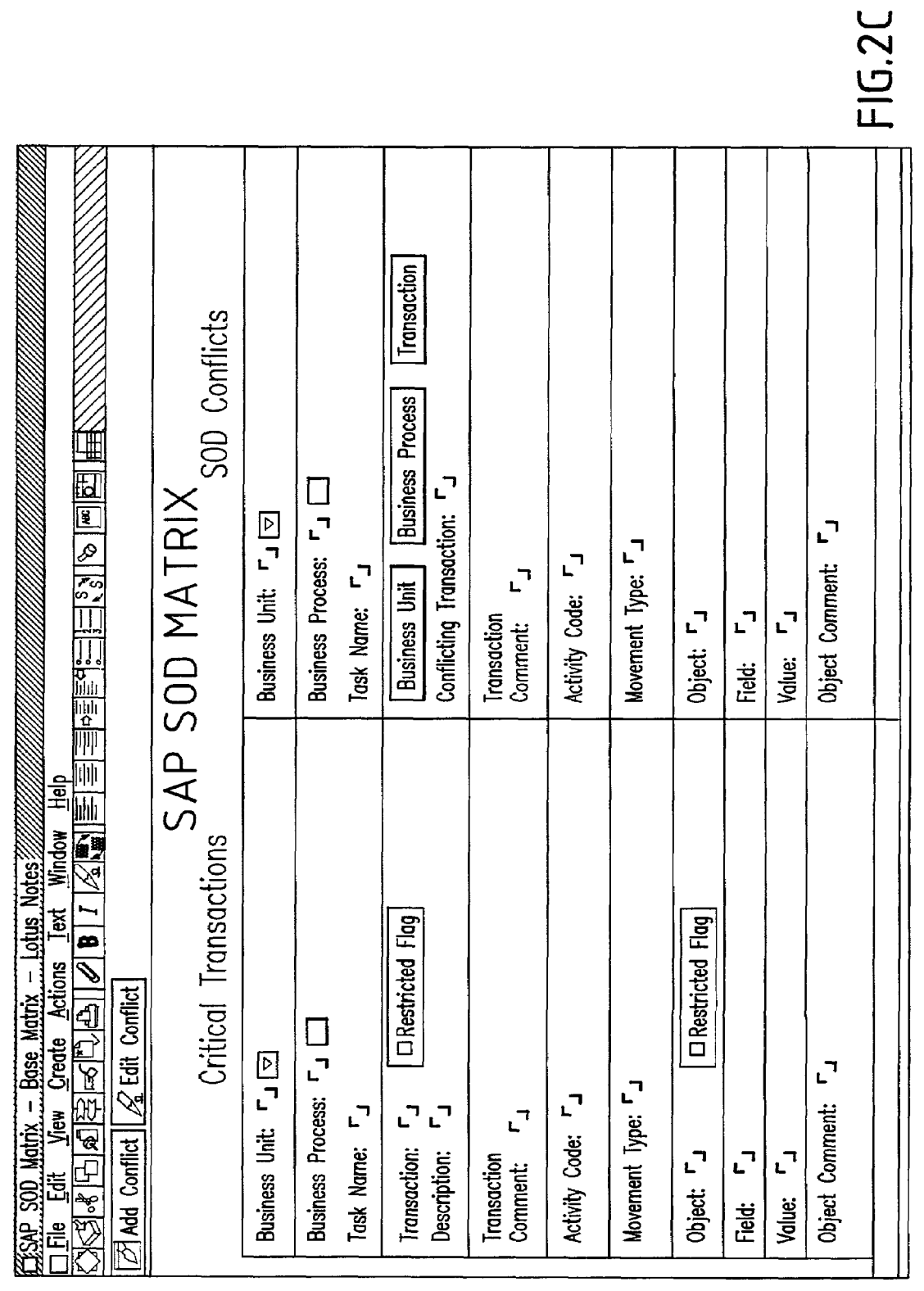

In a preferred embodiment, the matrix comprises a database containing critical transactions, their descriptions, objects, authorization field values, restricted authority, SOD conflicts, and conflict explanations. As shown in the exemplary display screens of FIGS. 2B and 2C, the data is preferably contained in one database with multiple views and categorized by business unit, business process, task, transaction, authorization, etc. For example, FIG. 2B shows two business units (Basis and Finance) and business processes including Authorization, profile, and user maintenance as well as accounts payable and their associated transactions (5003-5051). FIG. 2C illustrates one exemplary selection screen that includes pull-down menus for critical transactions and SOD conflicts (e.g., Business unit, Business process, task name, etc.) As would be understood by one ordinarily skilled in the art given this disclosure, other aspects of the matrix are not illustrated but would be included in the database. For example, business processes that would be included in the matrix are profile maintenance, accounts payable, shipping, etc. Examples of other tasks that would also be included are: create a sales order, post accruals, etc. Examples of other transactions are VA01— (create sales order) FB01 (post accruals). Authorizations are a group of field values that are used by the transaction to execute. An example of an authorization code for activity is; 01 (create), 02 (display), 03 (read), etc. Movement types are a number code which tells the object-oriented application how to disposition the item. In a preferred embodiment, the SOD matrix will have restricted access for data entry and change. Additionally, this access will provide the capability for creating the SOD conflict table. By recording data in the appropriate field, conflicts (with explanations, see FIG. 2C) can be built by business unit, business process, task, transaction, etc. Restricted authority can be established at the transaction and object level. The matrix contains multiple views to the data.

Figure 3:
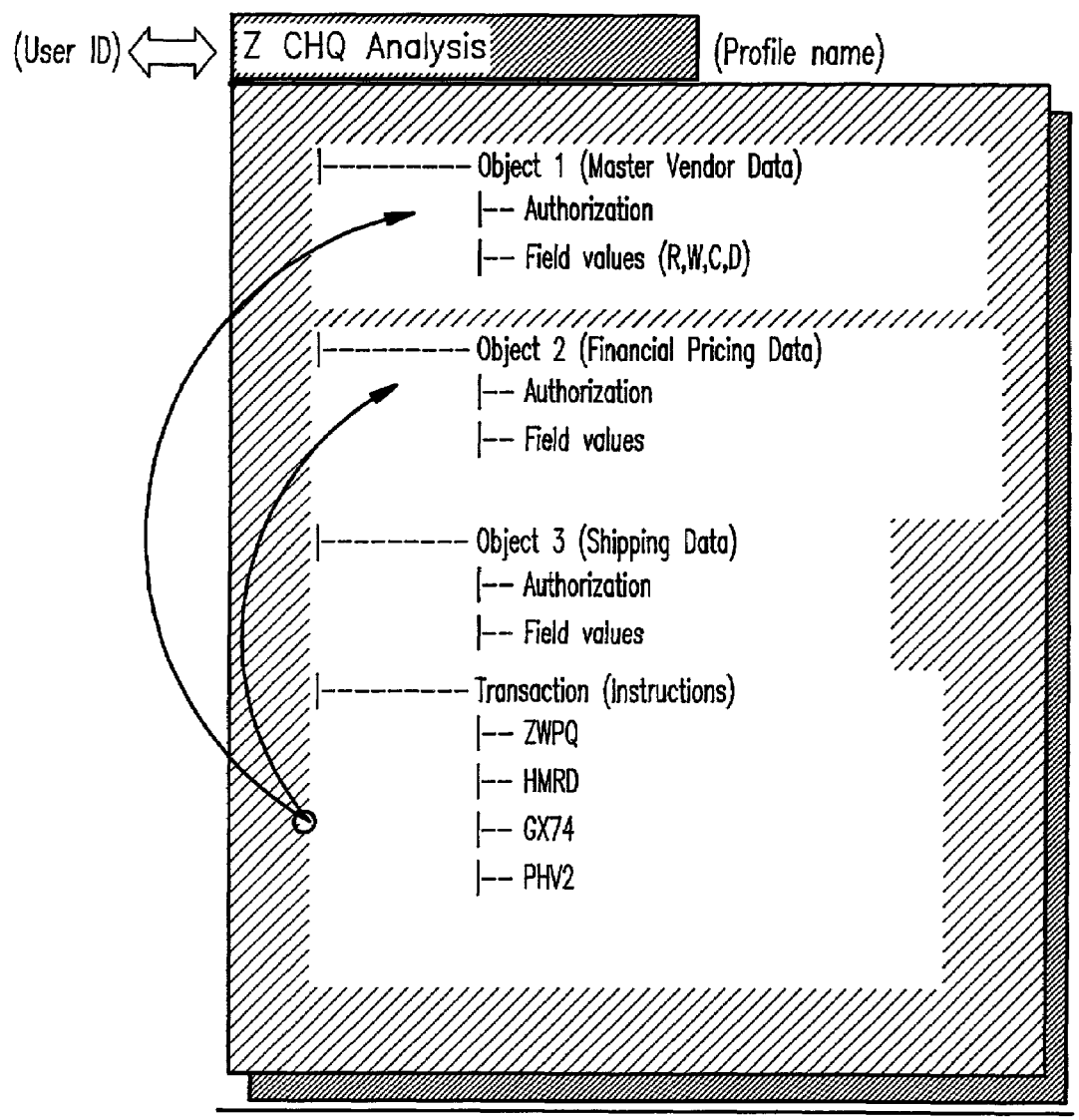
FIG. 3 is a schematic diagram of a profile that includes transactions that act on objects.

The inventive SOD analysis program uses the data in the SOD matrix and various tables within object-oriented integrated enterprise wide application to determine conflicts and errors in actual object-oriented enterprise wide application profiles. FIG. 3 presents a schematic diagram of an exemplary profile. A user ID and profile are required to access the application. The profile is given a profile name (in this example, "Z_CHQ_Analysis") to distinguish it from other profiles. In the example shown in FIG. 3, three objects (master vendor data, financial pricing data, and shipping data) are acted upon by four different transactions (ZWPQ, HMRD, GX74, PHV2). These transactions are instructions which operate on (create, analyze and/or change) the data objects. Each of the objects contains authorization and field values which allows activity to be performed on the data. With the invention, the separations-of-duties matrix is used to determine whether the user (shown in the user ID) has conflicting authorization to read or change the data associated with different objects.

More specifically, the invention identifies business activity conflicts which should not be allowed in the profiles by using retrieved data tables that include profiles, a listing of users and assigned profiles, and a listing of the objects that are appropriate for the transactions. The invention uses the separations of duties (SOD) matrix containing restrictions relating to the users, the objects and the transactions and determines if the users have conflicting authority to access the system data. This authority check is based on the SOD matrix and the system supplied table data. The invention also determines, within each of the profiles, whether custom created transactions, those not supplied with the original application are being used or if they create business conflicts when assigned within one profile.

The invention can produce a listing of profiles containing business conflicts by user and/or a listing of restricted transactions by user. The SOD matrix can be specific to the business application such that the organization will determine conflicts within the different business units. In a preferred embodiment, these reports include explanations of the conflicts.

Figure 4A:
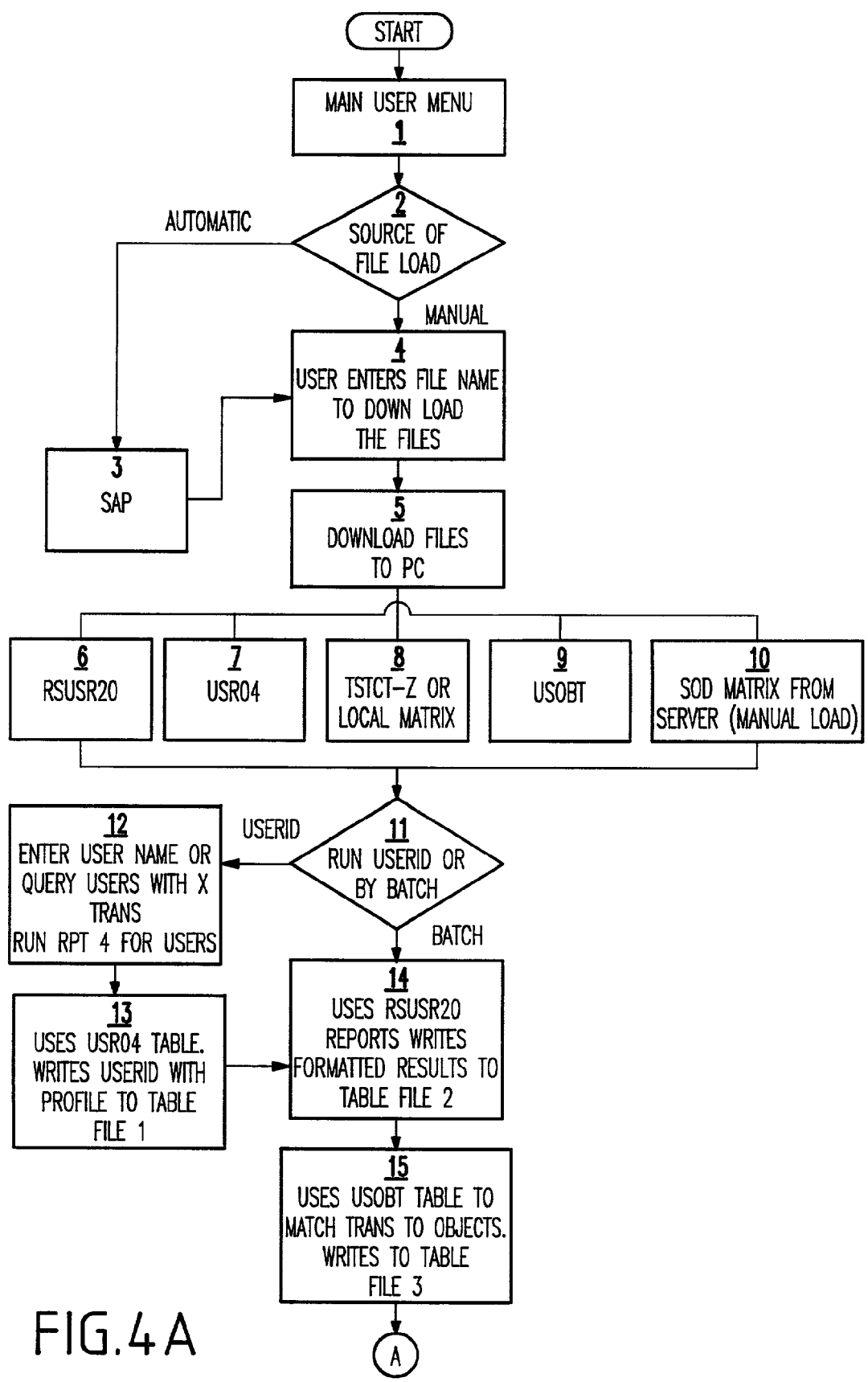
FIG. 4A is a flow diagram illustrating one preferred method of the invention.
Figure 4B:
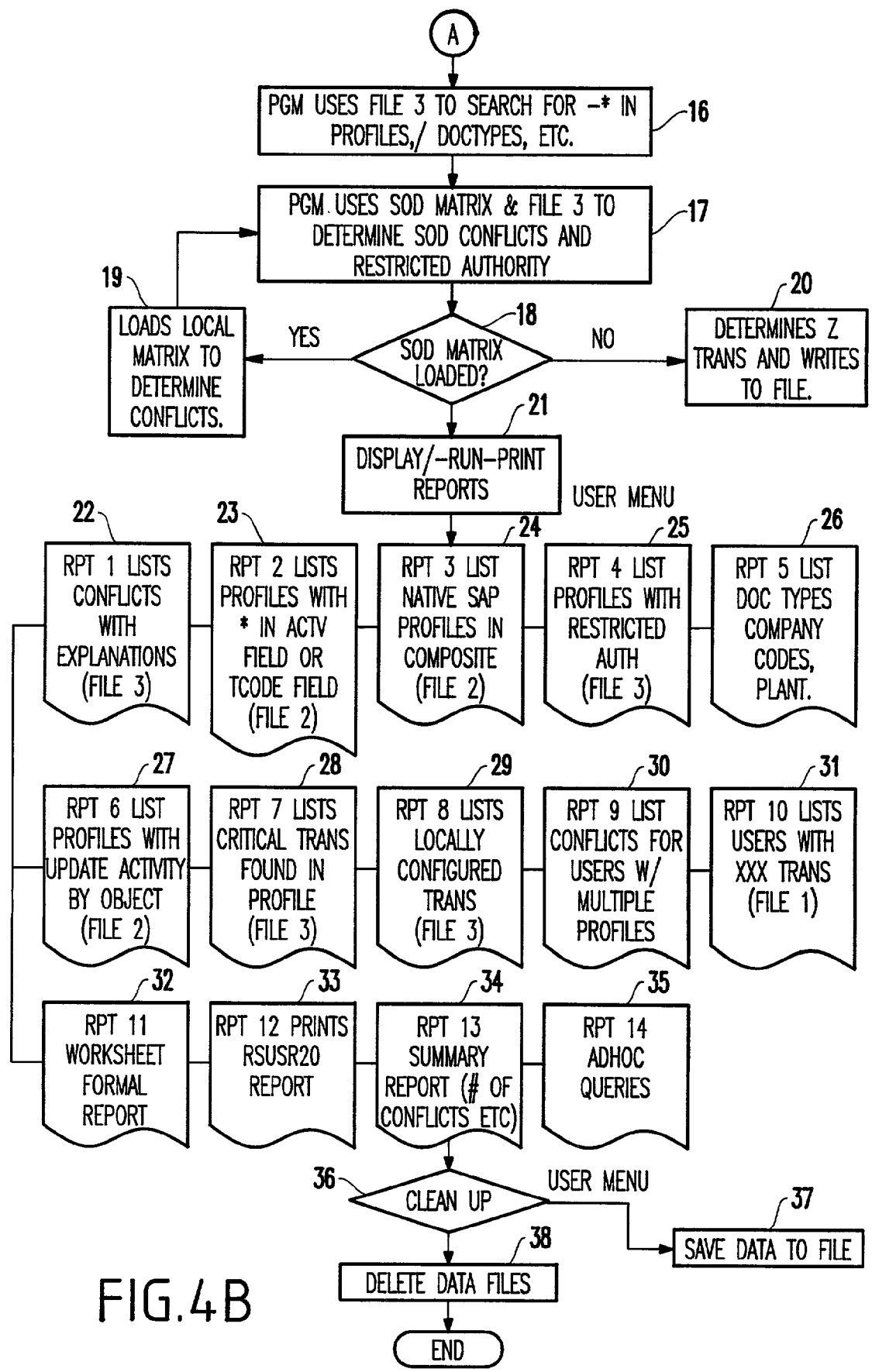
FIG. 4B is a flow diagram illustrating one preferred method of the invention.

Referring now to FIGS. 4A-4B, the invention is shown in flowchart form. In item 1, the user is presented with a menu containing options about running the program and obtaining reports. In item 2, the user has the option of loading the required files. As shown in item 3, the files can be loaded automatically (via a link with the object-oriented enterprise application (e.g., SAP)) to the users PC, or, as shown in item 4 downloaded to DOS files that have been e-mailed to the user. After the download in item 4, the user enters the directory name to which the files will be written. In item 5, the following files are downloaded. As would be known by one ordinarily skilled in the art given this disclosure, the files discussed below (6-10) are merely exemplary and other similar files could be loaded depending upon the specific application involved. The files include, as shown in item 6, a RSUSR020 report from SAP or other application that contains the transactions, objects, and authorizations for each profile that is being run throughout the program 3. In a preferred alternative embodiment, the user tables (USR01, USR02, USR03, etc.) can be used in place of the reports or histories (e.g., in place of RSUSR020, USH2, USH4, USH10, USH12, etc.).

As shown in item 7, the SAP USR04 table contains the user ID's and assigned profiles for the installation. The table names will differ in other enterprise wide applications. In item 8, the SAP TSTCT—table contains the transactions and descriptions for a given application. For example; the transaction name is VA01—and the description is Create Sales Order. These base transactions are supplied with the application and their use is generally known.

Additionally, if custom transactions were created, meaning transactions that were not originally supplied with the application, the transactions are also contained in the SAP TSTCT table or other application table name. As the transaction name and description of these transactions are customer created, it is necessary to determine how they are used within each profile. By entering the transactions into the invention tools SOD Matrix, business conflicts can be established thereby identifying them via the invention tool.

In item 9, the SAP USOBT table contains the combinations for transactions, objects, and authorizations allowed. Since the USOBT table 9 contains the complete list of transactions, objects and authorizations, it is used to associate the transactions with objects as used in the profile. In addition to the invention supplied transaction conflicts, any business specific or custom created transaction can be loaded into the SOD matrix as illustrated in item 10. This will allow for SOD analysis to take place with specific business settings for any application installation. This is not obtained from the object-oriented application and, instead is loaded manually into the invention tools SOD Matrix. The files in items 6-10 are then accessible and processed by the invention as described below.

In item 11, the user has the option of performing analysis by each individual user ID or running profiles sequentially in batches. When analyzing profiles for conflicts all profiles can be downloaded at once and processed through the invention tool. In item 12, a user ID is entered and the invention analyzes all profiles for business conflicts in which the user is authorized. Alternatively, in item 12 the invention receives a transaction as an input variable and determines which users are authorized to execute that transaction. Either action produces a report of authorized users (e.g., by transaction or by profile). In item 13 data is recorded in what is termed "file 1". This report is RPT 4, in item 25, discussed below.

In item 14, the invention takes the application profiles (for example the SAP RSUSR020 file) and formats it into a table, which is called File 2. While item 12 and 13 will analyze a specific user's combined profile assignments, item 14 analyzes the profiles individually. This is necessary to determine conflicts when more then one profile is assigned to a user ID. In item 15, the invention uses File 2 from item 14 and the USOBT table from item 9 to match transactions with the objects. Because a profile will not always associate the trans-action to an object, the USOBT identifies the possibility of multiple transactions to access the same object. In this way, unintended authorization to objects can be identified. The matching objects/transaction table produced is called File 3.

Moving to FIG. 4B, item 16 reads File 3 and looks for data needed to produce reports 22-35 below. In item 17, the invention uses the SOD Matrix 10 and File 3 to determine if there are SOD conflicts by transactions and authorizations and writes the result to RPT 1 (item 22, below). In item 17, the invention also looks for restricted authority and writes to RPT 4. Restricted authority is identified in the invention tools SOD Matrix. For example, application administration transactions can be in conflict with other transactions but should also be restricted to certain roles or persons. Identifying a transaction or object as restricted enables the analyzer to verify the restriction.

In item 18, the invention checks to see if customized transactions were loaded in the SOD Matrix. These transactions and conflicts will have been added to the invention tools SOD matrix. In item 19, if customized transaction were entered in the SOD matrix in item 10, the invention additionally processes through item 17 with the customized transactions. All conflicts are displayed on the report in item 21. If there are no customized transaction loaded, processing proceeds with the base transactions that come with the invention tool (item 29).

Then processing proceeds to item 21 where the invention receives input to display, run, or print the reports shown in items 22-35. Each of the reports is briefly described below. RPT 1 (item 22) list conflicts with explanations (including explanations for custom transactions) from item 17. RPT 2 (item 23) lists profiles with wild card default setting such as an "*" in the activity field and/or the start transaction field. An asterisk indicates that there is no restriction to a certain authorization. This information is taken from File 2 in item 14.

A composite profile is a combination of other profiles under one name. In many installations of enterprise applications, the native profiles which come with the application are not used due to the wide range of access they provide. In item 24 RPT 3 identifies if native object-oriented enterprise application profiles are being used.

In item 25, RPT 4 list profiles with restricted authority that were found in step 17. RPT 5 (item 26) lists document types, company codes, plant codes, etc. for the profile from step 16. In item 27, RPT 6 lists profiles with application data update or create ability via transaction and object authorizations.

In item 28, RPT 7 lists critical transactions that are found in each profile. Critical transactions are identified in the invention tools SOD matrix. Since profiles often contain other transactions besides the ones which have been identified as having conflicts, this report lists only the critical transactions within the profile.

In item 29, RPT 8 lists the custom created transactions. In an SAP system, these transactions are identified by beginning with a "Y" or "Z".

In item 30, RPT 9 lists, by user, conflicts across multiple profiles. In other words, RPT 9 is produced by first determining which users are authorized to execute more than one profile using, for example, File 1 discussed above with respect to item 13. Then, for those users who can execute more than one profile, the invention determines whether any of the transactions contained in those profiles present a conflict.

In item 31, RPT 10 lists users with a specific transaction entered as a variable. For example; should the analyzer wish to see all the users or profiles which contain the transaction SU01 (from File 1). In item 32, RPT 11 lists profile and user analysis data in a format conducive to audit analysis. The profiles or users will be displayed in a table with columns containing the data. In item 33, RPT 12 prints the SAP RSUSR020 or application profile report file 6 as a report. In item 34, RPT 13 list summary data (e.g., the total number of conflicts, restricted authority, etc.) In item 35, the invention permits ad-hoc queries such as searches for profiles containing certain combinations of transactions or objects in RPT 14. Item 36 represents user menu clean up, item 37 represents saving to files on the user's PC, and item 38 represents the deletion of the user data files on the user's PC as part of the clean up process.

Figure 5:
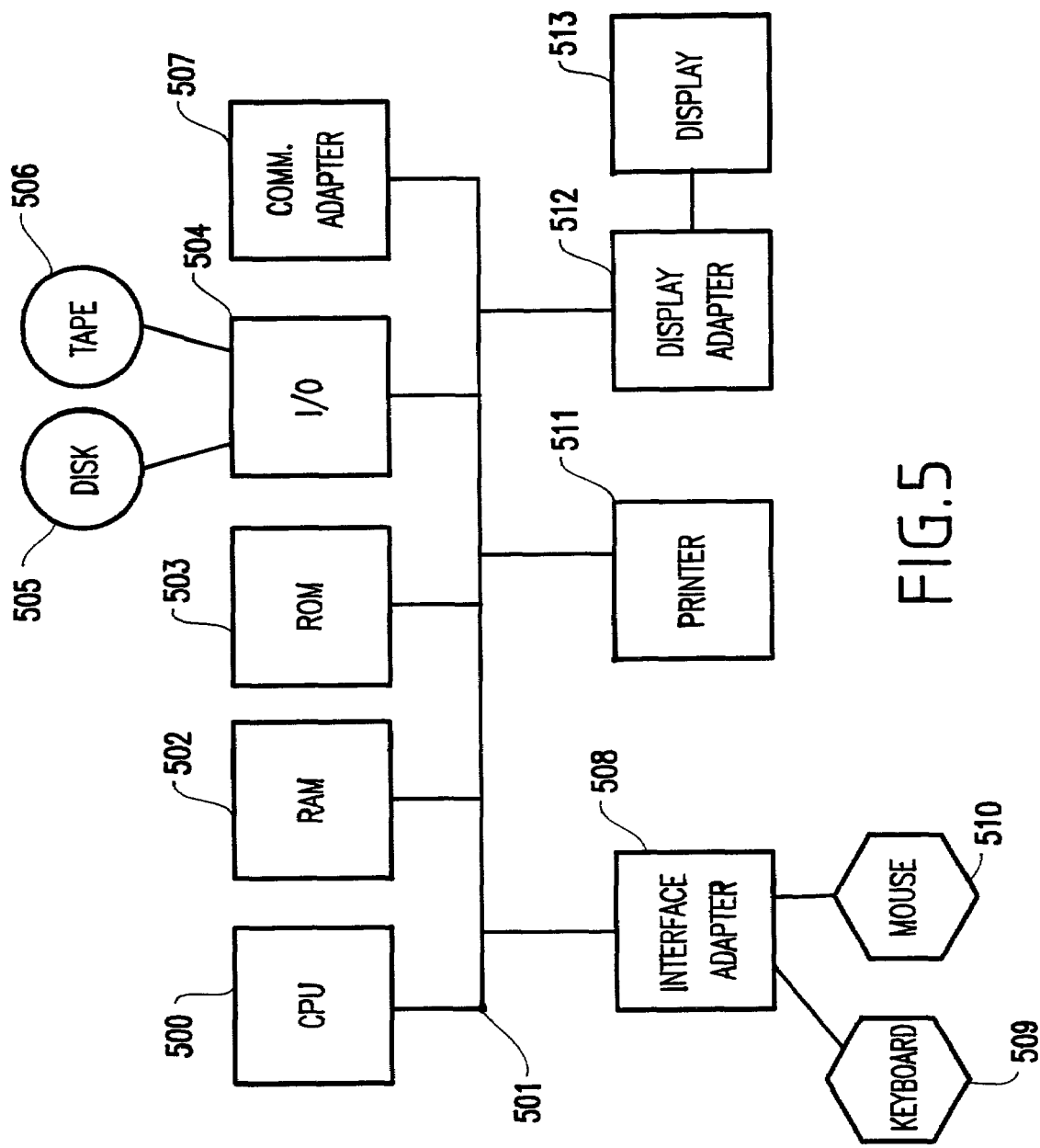
FIG. 5 is a schematic diagram of a hardware embodiment of the invention.

While the overall methodology of the invention is described above, the invention can be embodied in any number of different types of systems and executed in any number of different ways, as would be known by one ordinarily skilled in the art. For example, as illustrated in FIG. 5, a typical hardware configuration of an information handling/computer system in accordance with the invention preferably has at least one processor or central processing unit (CPU) 500. The central processing unit 500 could include various processing units, mapping units, weighting units, classification units, clustering units, filters, adders, subtractors, comparators, etc. Alternatively, as would be known by one ordinarily skilled in the art given this disclosure, multiple specialized CPU's (or other similar individual functional units) could perform the same processing, mapping, weighting, classifying, clustering, filtering, adding, subtracting, comparing, etc.

The CPU 500 is interconnected via a system bus 501 to a random access memory (RAM) 502, read-only memory (ROM) 503, input/output (I/O) adapter 504 (for connecting peripheral devices such as disk units 505 and tape drives 506 to the bus 501), communication adapter 507 (for connecting an information handling system to a data processing network) user interface adapter 508 (for connecting a peripherals 509-511 such as a keyboard, mouse, imager, microphone, speaker and/or other interface device to the bus 501), a printer 512, and display adapter 513 (for connecting the bus 501 to a display device 514). The invention could be implemented using the structure shown in FIG. 5 by including the inventive method, described above, within a computer program stored on the storage device 505. Such a computer program would act on information supplied through the interface units 509-511 or through the network connection 507. The system would then automatically perform the above processing and output the same on the display 514, through the printer 512 or back to the network 507.

The use of this invention tool is primarily for, but not limited to, application auditors. Enterprise application profile developers and business application owners can also use this tool to guide them in creating profiles with no business conflicts.

While the invention has been described in terms of preferred embodiments, those skilled in the art will recognize that the invention can be practiced with modification within the spirit and scope of the appended claims.

What is claimed is:

1. An independent programming tool for analyzing business separations-of-duties conflicts for users and profiles in an object-oriented application, wherein said tool comprises:
 a database containing a matrix of transactions, descriptions, object authorization values, and transactional separations-of-duties conflicts;
 an analysis engine adapted to use data from a plurality of data tables of said object oriented application in conjunction with said matrix to analyze business conflicts, and produce separations-of-duties conflict reports about said object-oriented application;
 wherein said analysis engine is adapted to use a separations of duty (SOD) matrix containing restrictions and business conflicts relating to said users, said objects and said transactions; and
 a user interface adapted to control said tool.

2. The tool in claim 1, the plurality of data tables comprises:
 a first data table of said data tables includes profiles that identify transactions and objects assignable to users;
 a second data table of said data tables includes a listing of users and assigned profiles;
 a third data table of said data tables indicates which of said transactions are available for each application; and
 a fourth data table of said data tables includes a listing of said objects that are appropriate for said transactions.

3. The tool in claim 2, wherein said analysis engine is adapted to:
 determine if said users and said profiles have authority to perform functions based on said SOD matrix and said second data table;
 determine, within each of said profiles, whether said transactions are appropriate based on said SOD matrix and said third data table; and
 determine, within each of said profiles, whether said transactions are properly associated with said objects based on said SOD matrix and said fourth data table.

4. The tool in claim 3, wherein said user interface is adapted to produce a listing of authorized profiles by user and a listing of authorized transactions by user.

5. The tool in claim 3, wherein said user interface is adapted to produce conflict reports, wherein said conflict reports list conflicts if:
 said users and said profiles have said authority to perform conflicting transactions, and
 said transactions are not appropriate,
 wherein said reports include explanations of said conflicts.

6. The tool in claim 1, wherein said transactions comprise instructions to take action on said profiles.

7. A tool for identifying conflicts in an object-oriented application, said tool comprising:
 a user interface adapted to allow an operator to control said tool;
 a data input adapted to retrieve data tables from said object-oriented application, wherein a first data table of said data tables includes profiles identifying transactions and objects assignable to users, a second data table of said data tables includes a listing of said users and assigned profiles, a third data table of said data tables indicates which of said transactions are available, and a fourth data table of said data tables that includes a listing of said objects appropriate for said transactions, wherein said objects comprise a set of data, wherein said transactions comprise sets of instructions that operate against said objects, and wherein said data input retrieves a separations of duty (SOD) matrix containing restrictions relating to said users, said profiles, said objects, and said transactions; and an analysis engine adapted to:
determine what authority said users have based on said SOD matrix and said second data table,
determine, within each of said profiles, whether said transactions are appropriate based on said SOD matrix and said third data table; and
determine, within each of said profiles, whether said transactions are properly associated with said objects based on said SOD matrix and said fourth data table.

8. The tool in claim 7, wherein said user interface is adapted to produce a listing of authorized profiles by user.

9. The tool in claim 7, wherein said user interface is adapted to produce a listing of authorized transactions by user.

10. The tool in claim 7, wherein said SOD matrix is specific to said object-oriented application.

11. The tool in claim 7, wherein said user interface is adapted to produce conflict reports, wherein said conflict reports list conflicts if:
said users have said authority to perform conflicting transactions;
said transactions are not appropriate; or
said transactions are not properly associated with said objects.

12. The tool in claim 11, wherein said reports include explanations of said conflicts.

13. The tool in claim 7, wherein said objects comprise specialized databases and said transactions comprise instructions to perform operations on said specialized databases.

14. A method of identifying conflicts in an object-oriented application, said method comprising:
retrieving data tables from said application, wherein a first data table of said data tables includes profiles that identify which transactions and objects can be assigned to users, a second data table of said data tables includes a listing of said users and their assigned profiles, a third data table of said data tables indicates whether said transactions are appropriate for said object-oriented application and a fourth data table of said data tables includes a listing of which of said objects are appropriate for said transactions, wherein said objects comprise a set of data, and wherein said transactions comprise sets of instructions that operate against said objects;
retrieving a separations of duties (SOD) matrix containing restrictions relating to said users, said objects and said transactions;
determining if said users have authority to activate said conflicts based on said SOD matrix and said second data table;
determining, within each of said profiles, whether said transactions are appropriate based on said SOD matrix and said third data table; and
determining, within each of said profiles, whether said transactions are properly associated with said objects based on said SOD matrix and said fourth data table.

15. The method in claim 14, further comprising producing a listing of authorized profiles by user.

16. The method in claim 14, further comprising producing a listing of authorized transactions by user.

17. The method in claim 14, wherein said SOD matrix is specific to said object-oriented application.

18. The method in claim 14, further comprising outputting conflict reports, wherein said conflict reports list conflicts if:
said users have said authority to activate said transactions;
said transactions are not appropriate; or
said transactions are not properly associated with said objects.

19. The method in claim 18, wherein said reports include explanations of said conflicts.

20. The method in claim 14, wherein said objects comprise specialized databases and said transactions comprise instructions to perform operations on said specialized databases.

21. A program storage device readable by machine, tangibly embodying a program of instructions executable by said machine to perform a method of identifying conflicts in an object-oriented application, said method comprising:
retrieving data tables from said application, wherein a first data table of said data tables includes profiles that identify which transactions and objects can be assigned to users, a second data table of said data tables includes a listing of said users and their assigned profiles, a third data table of said data tables indicates whether said transactions are appropriate for said object-oriented application and a fourth data table of said data tables includes a listing of which of said objects are appropriate for said transactions, wherein said objects comprise a set of data, and wherein said transactions comprise sets of instructions that operate against said objects;
retrieving a separations of duties (SOD) matrix containing restrictions relating to said users, said objects and said transactions;
determining if said users have authority to activate said conflicts based on said SOD matrix and said second data table;
determining, within each of said profiles, whether said transactions are appropriate based on said SOD matrix and said third data table; and
determining, within each of said profiles, whether said transactions are properly associated with said objects based on said SOD matrix and said fourth data table.

22. The program storage device in claim 21, wherein said method further comprises producing a listing of authorized profiles by user.

23. The program storage device in claim 21, wherein said method further comprises producing a listing of authorized transactions by user.

24. The program storage device in claim 21, wherein said SOD matrix is specific to said object-oriented application.

25. The program storage device in claim 21, wherein said method further comprises outputting conflict reports, wherein said conflict reports list conflicts if:
said users have said authority to activate said transactions;
said transactions are not appropriate; or
said transactions are not properly associated with said objects.

26. The program storage device in claim 25, wherein said reports include explanations of said conflicts.

27. The program storage device in claim 21, wherein said objects comprise specialized databases and said transactions comprise instructions to perform operations on said specialized databases.

* * * * *